United States Patent [19]

Katz et al.

[11] 4,095,111
[45] June 13, 1978

[54] LIGHT DENSITY SCALE IMAGING APPARATUS AND METHOD FOR USING SAME

[75] Inventors: Seymour Katz, Glen Cove; Victor R. Brown, West Hempstead, both of N.Y.

[73] Assignee: AGFA-GEVAERT, Antwerp, Belgium

[21] Appl. No.: 756,402

[22] Filed: Jan. 3, 1977

Related U.S. Application Data

[63] Continuation-in-part of Ser. No. 653,127, Jan. 28, 1976, Pat. No. 4,001,592.

[51] Int. Cl.² .................. G03B 41/16; G03C 5/16
[52] U.S. Cl. ............................................... 250/476
[58] Field of Search ............................ 250/476, 475

[56] References Cited

U.S. PATENT DOCUMENTS

| | | | |
|---|---|---|---|
| 1,953,249 | 4/1934 | Michel | 250/476 |
| 2,077,500 | 4/1937 | Townsend et al. | 250/476 |
| 2,426,884 | 9/1947 | Kieffer | 250/476 |
| 3,452,196 | 6/1969 | Gray | 250/476 |
| 3,668,394 | 6/1972 | Panzer | 250/476 |

*Primary Examiner*—Bruce C. Anderson
*Attorney, Agent, or Firm*—Lee C. Robinson, Jr.

[57] ABSTRACT

Apparatus for exposing film, such as X-ray film, in a cassette with light of predetermined intensity from a light density scale, and a method of using such apparatus and the developed film. The apparatus is provided with an energizable luminescent element which cooperates with an indicia bearing member provided with predetermined indicia and adapted to be inserted into imaging relation with respect to the luminescent element. A light density scale preferably formed of plural areas or strips of different densities is provided either on the luminescent element or on the indicia bearing member. When for example an X-ray film cassette is properly loaded onto the apparatus, the luminescent element is energized so as to expose the X-ray film simultaneously to the predetermined indicia and to light of different predetermined intensities as transmitted through the light density scale. Prior to or subsequent to this light imaging operation, the X-ray film in the cassette is exposed to an X-ray image of a subject. Then, the exposed X-ray film is developed to form a viewable image of the subject, the predetermined indicia and the light density scale. The brightness of the respective strips of the developed light density scale is measured, and the measured values are compared to other developed X-ray films to determine which of the developed films has a brightness that differs from a measured average value, such as may be caused by an undesired variation in the film developing operation, the film characteristics, etc.

11 Claims, 4 Drawing Figures

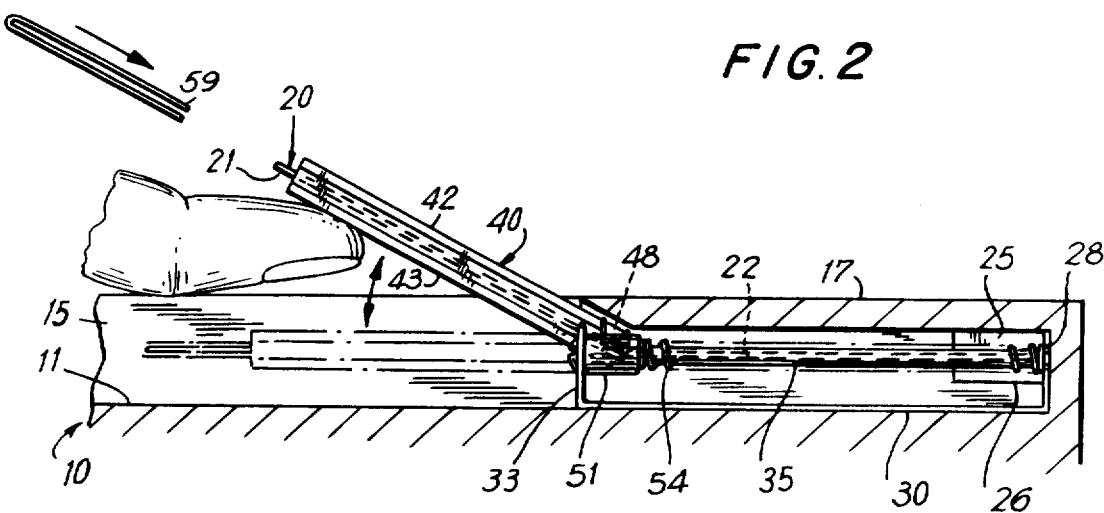
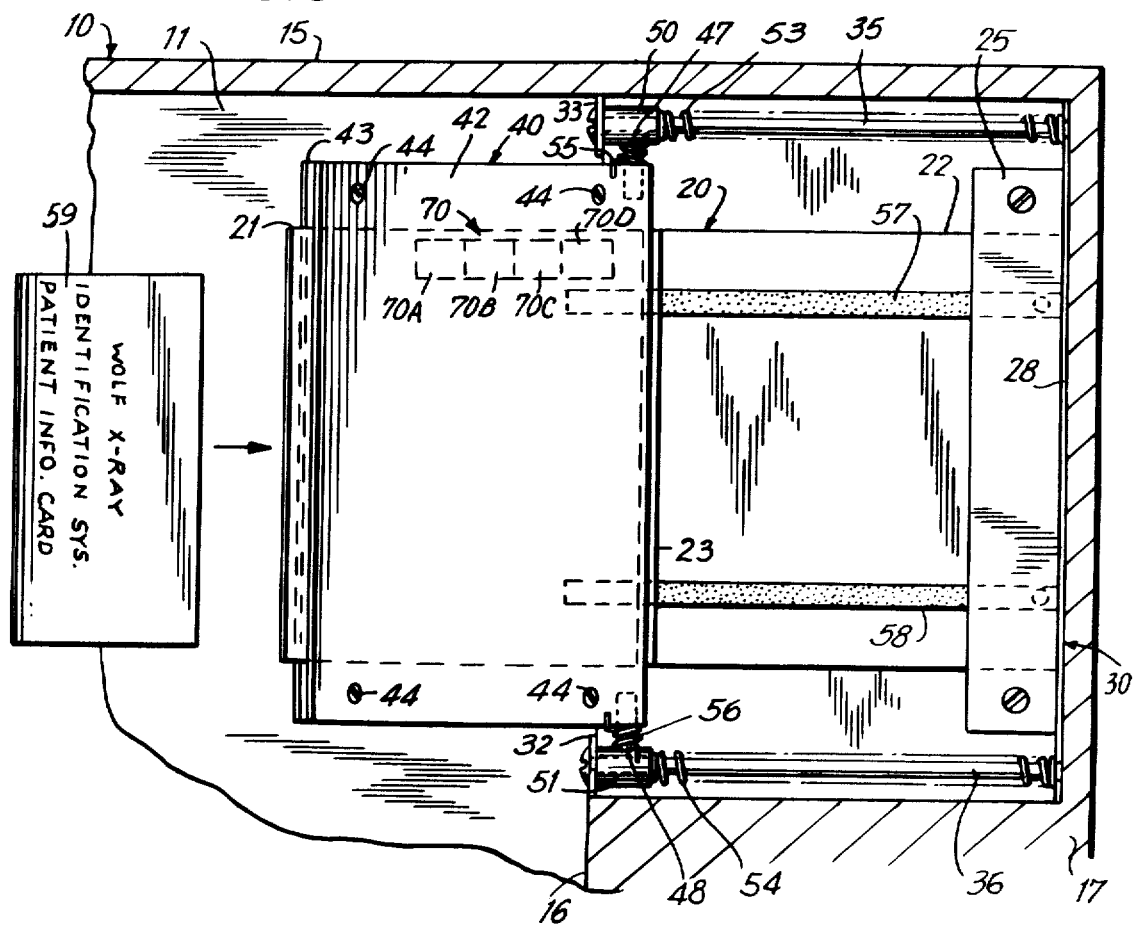

LIGHT DENSITY SCALE IMAGING APPARATUS AND METHOD FOR USING SAME

CROSS REFERENCE TO RELATED APPLICATIONS

This is a continuation-in-part of copending U.S. application Ser. No. 653,127 filed Jan. 28, 1976 by Seymour Katz and Victor R. Brown, now U.S. Pat. No. 4,001,592, granted Jan. 4, 1977.

BACKGROUND OF THE INVENTION

This invention relates to X-ray film exposure apparatus and, more particularly, to such apparatus wherein X-ray film in a cassette is exposed to a light density scale and, simultaneously, to predetermined indicia, and to a method of using such apparatus.

To facilitate the correlation of the indentity of a subject, such as a patient in a hospital, with a particular X-ray photograph, a film identification apparatus has been developed, such as that disclosed and claimed in U.S. Pat. No. 3,959,657, assigned to the assignee of the present invention. With this apparatus, an identification card is prepared, such as by typing, and inserted into the apparatus. Then, when an X-ray film cassette is loaded onto the apparatus, a luminescent element is energized to expose the X-ray film in the cassette to the patient identifying information on the card. Then (or prior to this light-exposure operation), the X-ray film cassette is exposed to an X-ray image of the patient. Upon development of the X-ray film, a viewable image of the X-ray photograph and the patient identifying information simultaneously is produced.

In general, exposure of the film to the patient identification information and the X-ray of the patient can be satisfactorily controlled such that substantially the same light and X-ray intensities are obtained for many exposure operations over an extended period of time. However, it is possible that, during the developing operation, various characteristics and variables of development may change. Also, film quality and its characteristics, as well as other factors, may vary over time. Thus, the quality or brightness of X-ray photographs taken days apart may vary. Hence, it is desirable to detect such variations so that suitable measures can be effected to correct such undesirable changes.

If a light-density scale formed of plural, for example, four, areas or strips of different densities, such as achromatic filter elements, is reproduced on the X-ray film for each X-ray photograph taken, then the quality of the developed images of selected X-ray photographs can be compared to each other. In the event of insufficient development, for example, the respective reproduced light-density scale of one X-ray photograph will appear generally lighter than the corresponding light-density scale of another photograph. Conversely, in the event of excessive development, the light-density scale of one X-ray photograph will appear darker than the corresponding light-density scale of another developed X-ray photograph.

Heretofore there have been various proposals for recording a light-density scale on X-ray film. The apparatus for carrying this out has exhibited a number of deficiencies, however, and for the most part necessitated a darkroom or other light-tight enclosure, thereby adding to the difficulty and inconvenience in its use.

OBJECTS OF THE INVENTION

Therefore, it is an object of the present invention to provide improved film exposure apparatus of the type wherein film while in a cassette is exposed simultaneously to predetermined indicia, such as indentification information, and to a light-density scale.

Another object of this invention is to provide a method of using apparatus of the character described so as to monitor variables in an X-ray photographing and developing operation.

A still further object of this invention is to provide a method of and improved apparatus for exposing X-ray film in a cassette to light of different predetermined intensities as determined by a light-density scale so that the resultant images developed on the film can be compared from one X-ray film to another so as to detect differences in the development of the film, quality of the film or other characteristics.

Various other objects, advantages and features of the present invention will become readily apparent from the following detailed description, and the novel features will be particularly pointed out in the appended claims.

SUMMARY OF THE INVENTION

In accordance with this invention, there is provided an improved film exposure apparatus of the type adapted to receive an X-ray film cassette and to expose the X-ray film in the cassette to optical indicia representing predetermined indicia of a subject when the cassette is loaded onto the exposure apparatus. An energizable luminescent element, normally protected by a shield member which is displaced from a shielding relation when the X-ray film cassette is loaded onto the exposure apparatus, emits light to expose the X-ray film with the predetermined indicia which is disposed on an indicia bearing member that is insertable into proper relation with respect to the luminescent element. A light-density scale is positioned with respect to the luminescent element such that when the luminescent element is energized, the X-ray film in the cassette is exposed to both the predetermined indicia and the light-density scale simultaneously, the light-density scale serving to expose the X-ray film to light of different predetermined intensities. In accordance with one aspect of this invention, the light-density scale is formed of different areas having different densities so that when the X-ray film is developed, a viewable reproduction of the different areas is formed thereon. The brightness of respective ones of the developed areas is measured, and the measured brightnesses of selected X-ray films are compared so as to determine which of the films has a brightness that varies from a measured average brightness. In this manner, undesired variations in the film characteristics, development process, etc., of the X-ray film can be detected.

BRIEF DESCRIPTION OF THE DRAWINGS

The following detailed description, given by way of example, will best be understood in conjunction with the accompanying drawings in which:

FIG. 2 is a sectional view of a portion of the apparatus shown in FIG. 1;

FIG. 3 is a top view, partially in section, of that portion of the apparatus shown in FIG. 2.

DETAILED DESCRIPTION OF THE DRAWINGS

Figure 1:
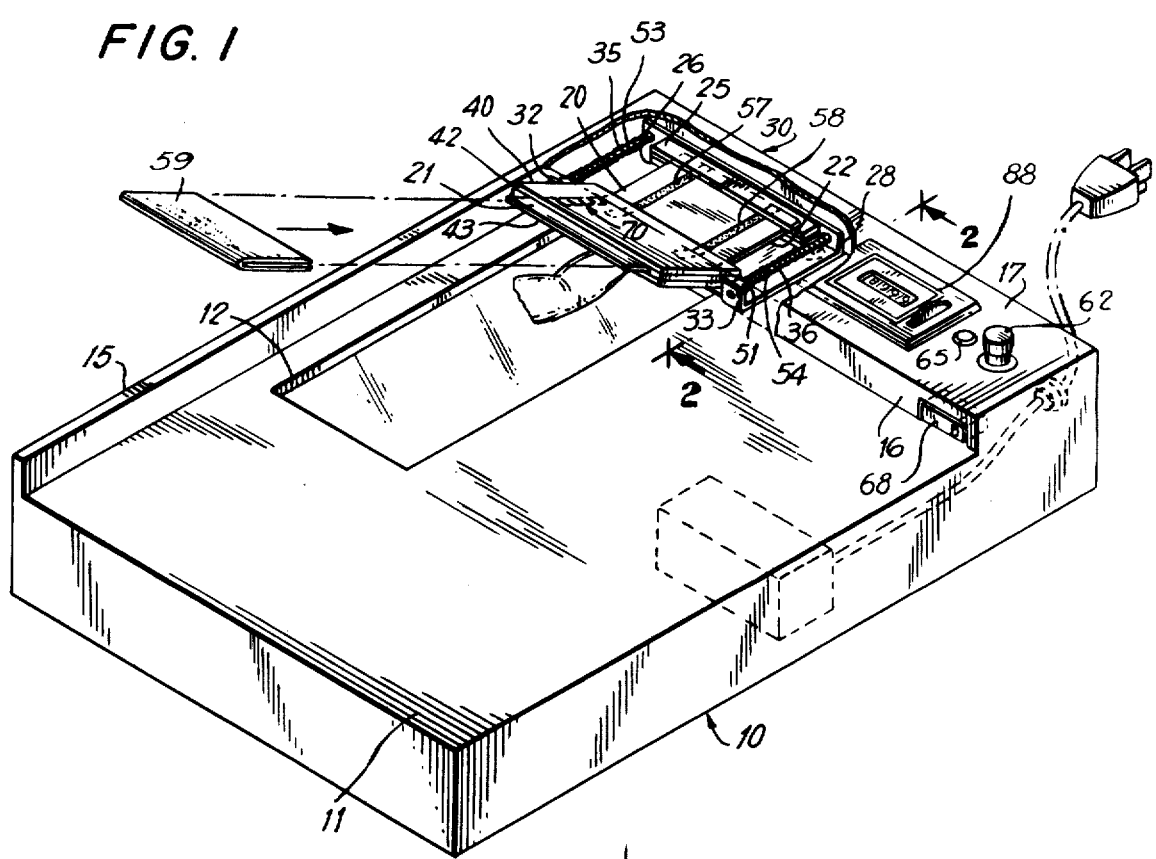
FIG. 1 is a perspective view of one embodiment of X-ray film exposure apparatus.

Referring now to FIG. 1, there is illustrated one embodiment of X-ray film exposure apparatus which is useful with the present invention. This apparatus is more fully described in U.S. Pat. No. 3,959,657 referred to above. As disclosed in said patent, the X-ray film exposure apparatus 10 is provided with a flat surface 11 having a rectangular access opening 12. The surface 11 is adapted to accommodate an X-ray film cassette and includes a guide flange 15 and an abutment flange 16 so as to guide and stop the cassette, respectively. A luminescent member 20 of flat rectangular configuration is adapted to be energized electrically so as to emit light of sufficient intensity to expose the X-ray film in the cassette. As shown in FIGS. 2 and 3, luminescent member 20 includes a protruding tab portion 21 connected to a rear portion 22 by a flap-type hinge 23.

A pair of clamping plates 25 and 26 is secured to a flange 28 on bracket 30 so as to affix rear portion 22 to the apparatus. The forward edge of bracket 30 includes a pair of upstanding ears 32 and 33 to support guide rods 35 and 36, respectively. A slide member 40 is formed of upper and lower plates 42 and 43, respectively, movably carried by guide rods 35 and 36 and spaced apart adjacent the surfaces of luminescent member 20. Pivot pins 47 and 48 protrude outwardly from the rearward corners of slide member 40 and are carried by collars 50 and 51 which extend around guide rods 35 and 36. Collars 50 and 51 are biased to the forward position by coil springs 53 and 54 around guide rods 35 and 36. With this arrangement, slide member 40 is slidably movable from its forward position as shown in FIGS. 2 and 3 to its rearward position (not shown) against the resilient bias force of springs 53 and 54. When in its forward position, as shown, slide member 40 effectively shields luminescent member 20 so as to block any light that may be emitted by the luminescent member. However, when slide member 40 moves to its rearward position, it is displaced from its shielding relation with respect to the luminescent member such that the light emitted by luminescent member 20 can be used to expose the X-ray film in a cassette loaded onto the exposure apparatus to information.

As shown in FIG. 2, member 40, together with tab portion 21 of luminescent member 20, can be pivoted in an upward direction to facilitate the insertion of an information-bearing card 59 on tab portion 21.

As described in U.S. Pat. No. 3,959,657, tab portion 21 is adapted to receive a folded indicia-bearing card 59 which includes such information as a patient's name, address, physician, identification number, and the like. This card may be prepared by any suitable printing device, such as a typewriter.

In use, card 59 is inserted over protruding tab portion 21 and then an X-ray film cassette, which had been loaded with X-ray film, is loaded onto the illustrated apparatus. The cassette is guided toward luminescent member 20 such that as the forward edge of the cassette engages member 40, the member is urged, or pushed, in a rearward direction. Hence, member 40 is moved away from its shielding relation with respect to tab portion 21 and luminescent member 20. Continued movement of the cassette causes card 59 and luminescent member 20 to be inserted into a suitable opening of the cassette (not shown). Once the cassette is properly positioned, it engages 68 a switch to energize a suitable electrical circuit, thereby energizing luminescent member 20 via conductive strips 57 and 58. Consequently, a predetermined amount of light is emitted from the luminescent member for a predetermined duration of time so as to expose the X-ray film in the loaded cassette to the indicia provided on card 59. As more fully described in the above U.S. Pat. No. 3,959,657 and 4,001,592, an on-off switch 62, an indicator light 65 and a counter 88 are mounted on the ledge 17 of the apparatus 10. The counter provides a visual indication of the number of energizations of the electroluminescent panel 20.

Subsequent to this exposure, the X-ray film in the cassette is exposed to an X-ray image of the patient. Alternatively, this X-ray photograph can be taken prior to the exposure of the X-ray film to the indicia on card 59. As described in U.S. Pat. No. 3,959,657, a suitable lead shield is provided on the X-ray film cassette so as to avoid any interference between the information to which the X-ray film is exposed by luminescent panel 20 and the X-ray of the patient which is provided on the remainder of the X-ray film.

As shown in FIG. 3, a light-density scale 70 is provided. Preferably, light-density scale 70 is mounted on luminescent member 20 along one edge thereof. In an alternative embodiment, this light-density scale is provided on or integral with indicia-bearing card 59. The light-density scale is formed of plural areas of different density, such as areas or strips 70A, 70B, 70C and 70D, respectively. The differing density of these areas results in light of different intensity being transmitted therethrough from luminescent member 20 to the X-ray film in the loaded cassette. In one embodiment, the strip of lightest density, that is, the strip through which light of greatest intensity is transmitted, is provided as strip 70A, and the remaining strips 70B, 70C and 70D are of progressively greater density such that light of lesser intensities are transmitted therethrough. Thus, strip 70D is the darkest strip.

When member 40 normally is disposed in its light shielding relation, light-density scale 70 is correspondingly shielded. However, when an X-ray film cassette is loaded onto the illustrated apparatus such that member 40 slides to its rearward position, energization of luminescent member 20 causes light emitted thereby to be transmitted through the respective strips 70A, . . . 70D so as to expose the X-ray film in the cassette to the light-density scale. Hence, the X-ray film is exposed simultaneously to the indicia provided on card 59 as well as to the light-density scale 70. That is, latent images are formed on the X-ray film having light intensities corresponding to the lightest strip 70A, the next lightest strip 70B, the next darker strip 70C and the darkest strip 70D, respectively.

After the X-ray film is exposed to the indicia provided on card 59 and to light-density scale 70, it then is exposed to an X-ray of the patient. Of course, as mentioned above, the X-ray photograph can be taken initially and the indicia and light-density scale exposures can be made subsequently. In either case, after the X-ray film is suitably exposed to the indicia, the light-density scale and to the X-rays, the film is developed in conventional manner. Hence, a viewable image is formed on the developed X-ray film corresponding to the indicia provided on card 59, the respective strips 70A, . . . 70D of varying density and to the X-rayed patient. Each of the reproduced strip images on the X-ray film can be measured by suitable density measuring apparatus so as to provide an indication of the relative brightness of each strip image and, consequently, an indication of the relative brightness of the X-ray photograph. An example of such density-measuring apparatus is the densitometer, manufactured by low X-Ray Division of IPCO Hospital Supply Corp., White Plains, N.Y. Another example of a suitable densitometer that can be used to measure the density of the respective reproduced strip images is manufactured by Tobias Associates, Inc., Ivyland, Pa.

The resultant measurements made by such a densitometer represent the different light intensities that were transmitted by the respective strips included in light-density scale 70. In each light-exposure operation, substantially the same amount of light of the same length of time is transmitted through the respective strips. Therefore, if all variables in the X-ray photographing and developing operation remain constant from day-to-day, it is expected that the density measurements of the respective strips will be substantially the same from one developed X-ray film to the next. That is, the measured brightness of, for example, the reproduced image of strip 70A will be the same for all developed X-ray photographs. Similarly, the measured brightness of the reproduced images of strips 70B, 70C and 70D, respectively, also will be the same for all developed X-ray photographs. However, although the light-exposure apparatus and variables can be substantially controlled, it often happens that variations occur in the developing operation of the X-ray film, the quality of the film, etc. over periods of time. Thus, if substantial differences are detected in the measured brightness of the respective reproduced strip images developed on the X-ray film, it is highly likely that a factor in the developing operation or other characteristic has changed.

Figure 4:
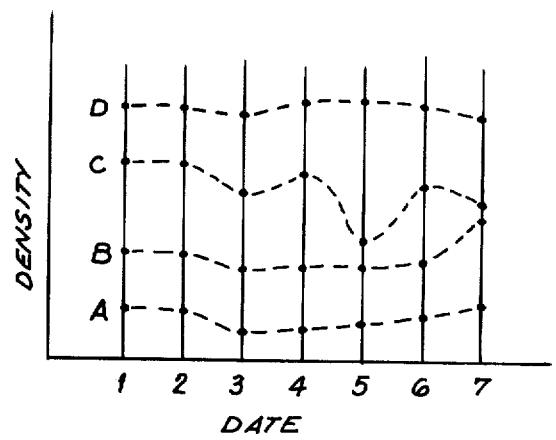
FIG. 4 is a graphical representation of the results of comparison of different X-ray photographs to detect undesired differences therebetween.

To illustrate how the measurements of the reproduced light-density scale can be used to detect significant differences between developed X-ray photographs, reference is made to the graphical representation shown in FIG. 4. The ordinate of this graph represents density measurements as made by the densitometer, and the abscissa represents the date on which the selected X-ray photographs were taken and developed. As may be appreciated, in the event that a large number of X-ray photographs are taken on a daily basis, it is expected that only a selected photograph or photographs for each day will be measured. Measurements A, B, C and D correspond to the respective densities of the reproduced images for strips 70A, 70B, 70C and 70D, respectively. If all factors or variables, such as in the developing operation, remain constant, it is expected that measurements A, B, C and D will remain substantially the same for all of the sampled X-ray photographs. Assuming that it is acceptable for such variables to change within established tolerances, then respective curves for measurements A, B, C and D established by the sampled X-ray photographs generally will conform to a measured average level. Any deviation in a particular density measurement thus will be readily noticeable and suitable steps can be taken to correct the developing operation or compensate for other factors accordingly.

As shown in FIG. 4, the measurements A, B, C and D made on day 2 are substantially the same as those made on day 1. However, on day 3, it is seen that the density measurements differ from the measured average levels. Depending upon whether these differences are acceptable, a technician can make such changes in the factors of the developing operation or other characteristics so as to correct for the measured deviations. Assuming that such corrections have been made, it is seen that measurements A, B, C and D made on day 4 approximate the measured average level. However, on day 5, it is seen that the density of the reproduced strip 70C deviates from its measured average level by an unacceptable amount. In this instance, the technician may make suitable changes so that the quality of subsequent X-ray photographs will be acceptable. The remainder of the graph shown in FIG. 4 illustrates how further X-rays photographs can be sampled and measured to determine whether the quality thereof is satisfactory.

Thus, it is seen that quality control over an X-ray photographing and developing operation can be attained in a simple manner. By exposing X-ray film in a cassette to a light-density scale and then measuring the densities of the reproduced scale, undesired variations of sampled photographs are readily detected. Suitable steps then can be taken to insure that subsequent photographs will be processed properly so that accurate X-ray photographs of subjects can be achieved.

While the present invention has been particularly shown and described in the environment of preferred X-ray film exposure apparatus, it is appreciated that various modifications and changes in form and details can be made without departing from the spirit and scope of the invention. The aforedescribed method can be performed on each and every X-ray photograph that is taken or, as is more practical, samples of a batch of photographs made at a selected time, such as daily, can be measured to determine whether the quality of the photographs is acceptable. It is intended that the appended claims be interpreted as including the various changes in the invention which will appear obvious to one of ordinary skill in the art.

What is claimed is:

1. In photographic film exposure apparatus of the type adapted to receive a film cassette and including an energizable luminescent element normally protected by a shield member which is displaced from a shielding relation as said film cassette is loaded onto said exposure apparatus so as to permit said luminescent element to emit light, the improvement comprising a light-density scale formed of plural areas of different densities positioned relative to said luminescent element so that light passes therethrough to expose said film in said cassette to said light density scale when said luminescent element is energized; and means automatically operable in response to the loading of said cassette onto said exposure apparatus for energizing said luminescent element for a predetermined duration of time to irradiate said film with light from said luminescent element and thereby expose the film to said scale.

2. In photographic film exposure apparatus of the type adapted to receive a film cassette and to expose the film in said cassette to optical indicia representing predetermined indicia of a subject when said cassette is loaded onto said exposure apparatus either before or after said film is exposed to said subject but before said flm is developed, said film exposure apparatus including an energizable luminescent element normally protected by a shield member which is displaced from a shielding relation as said film cassette is loaded onto said exposure apparatus so as to permit said luminescent element to emit light and expose said film to said predetermined indicia, the improvement comprising an indicia bearing member provided with said predetermined indicia and being inserted into predetermined relation with respect to said luminescent element; and a light-density scale disposed with respect to said luminescent element such that said film in said cassette is simultaneously exposed to said predetermined indicia and to said light-density scale when said luminescent element is energized to emit light so as to expose said film to light from said element of different predetermined intensities through said light density scale.

3. In X-ray film exposure apparatus of the type adapted to receive an X-ray film cassette and to expose the X-ray film in said cassette to optical indicia representing predetermined indicia of a subject when said cassette is loaded onto said exposure apparatus either before or after said film is exposed to X-rays of said subject but before said film is developed, said X-ray film exposure apparatus including an energizable luminescent element normally protected by a shield member which is displaced from a shielding relation when said X-ray film cassette is loaded onto said exposure apparatus to as to permit said luminescent element to emit light and expose said X-ray film in said cassette to said predetermined indicia, the improvement comprising an indicia bearing member provided with said predetermined indicia and being inserted into predetermined relation with respect to said luminescent element; and a light-density scale provided with spaced-apart areas of varying density lying in a single flat plane on a portion of said luminescent element such that said X-ray film is exposed to said predetermined indicia and to spaced areas of light from said element of different predetermined intensities corresponding to said areas when said luminescent element is energized.

4. A method of monitoring photographic variables, comprising the steps of loading a cassette with X-ray film; exposing the film while in said cassette to a light-density scale; exposing said film to a subject independently of its exposure to said light-density scale; developing said exposed film to form a viewable image of said subject and to reproduce said scale; repeating the foregoing steps for successive films; and evaluating the reproductions of the light-density scale of the successive films to detect variations therebetween.

5. A method of monitoring variables on photographic film, comprising the steps of inserting the photographic film in a film cassette; placing a first portion of the film while in said cassette in juxtaposition with a light-density scale having successive areas of predetermined varying density; exposing the first portion of said film while in said cassette to said light-density scale; exposing a second portion of the film to a subject either before or after the exposure of said first portion to said light-density scale; developing said film to form a viewable image of said subject and to reproduce said light-density scale; repeating the foregoing steps for successive photographic films; and measuring the densities of the reproduced areas of the light-density scales on the successive films to detect differences therebetween.

6. A method of monitoring variables in an X-ray photographing and developing operation, comprising the steps of loading an X-ray film cassette onto X-ray film exposure apparatus; automatically exposing said X-ray film in said cassette to predetermined subject-identifying indicia and to a light-density scle in response to the loading of the film onto said apparatus, said light-density scale being constituted by areas of different densities; exposing said X-ray film to X-rays of a subject; developing said exposed X-ray film to form a viewable image of said predetermined suject-identifying indicia, said light-density scale and said X-rayed subject; repeating the foregoing steps for successive X-ray film cassettes; and measuring the viewable image of the different light intensities of said light-density scale of selected X-ray films to detect differences between developed films.

7. A method of detecting undesired variations in the development and/or use of X-ray film, comprising the steps of loading an X-ray film cassette onto X-ray film exposure apparatus; simultaneously exposing said X-ray film in said cassette to predetermined subject-identifying indicia, and to a light-density scale formed of areas of different density which transmit light of correspondingly different intensities; exposing said X-ray film in said cassette to X-rays of a subject independently of its exposure to said subject identifying indicia and said light-density scale; developing said exposed X-ray film to form a viewable image of said predetermined subject indicia, said different density areas and said X-rayed subject; repeating the foregoing steps for successive X-ray film cassettes; measuring the brightness of respective ones of the developed different density areas; comparing the measured brightness of corresponding developed density areas of selected X-ray films; and determining which of said films has a brightness that varies from a measured average brightness.

8. For use with X-ray film exposure apparatus of the type adapted to receive an X-ray film cassette and to expose the X-ray film in said cassette to optical indicia representing predetermined indicia of a subject when said cassette is loaded onto said exposure apparatus either before or after an X-ray photograph is taken of said subject but before said photograph is developed, said X-ray film exposure apparatus including an energizable luminescent element normally protected by a shield member which is displaced from a shielding relation as said X-ray film cassette is loaded onto said exposure apparatus so as to permit said luminescent element to emit light and expose said X-ray film in said cassette to said predetermined indicia, an indicia bearing member provided with said predetermined indicia and insertable into predetermined position with respect to said luminescent element, and plural areas of varying density values mounted on a portion of said luminescent member, the method comprising the steps of loading said X-ray film cassette onto said apparatus; automatically energizing said luminescent element in response to the loading of said cassette onto said apparatus to expose said X-ray film in said cassette simultaneously to said predetermined indicia and to said areas of varying density values; exposing said X-ray film in said cassette to X-rays of said subject; developing said exposed X-ray film; measuring the brightness of each of the developed areas of varying density values; repeating the foregoing steps with other X-ray film cassettes; and comparing the measured brightness of said developed areas for different X-ray films to detect variations therebetween.

9. Apparatus for placing density information on X-ray film within a cassette, the apparatus comprising, in combination:

a cassette supporting member;

an electroluminescent panel carried by the supporting member, the panel having a protruding tab portion in position to extend within a cassette received by said member;

means including a light-density scale removably disposed on the protruding tab portion of the electroluminescent panel, the light-density scale being formed of spaced apart areas of varying density which lie in a single flat plane; and means for energizing said panel, to illuminate the same and thereby expose the film within the cassette with the information on the indicia means.

10. Apparatus for placing density information and identifying indicia on X-ray film within a cassette having a panel receiving slot adjacent one edge thereof, the apparatus comprising, in combination:

a cassette supporting member;

an electroluminescent panel carried by the supporting member, the panel having a protruding tab portion in position to extend within the slot of a cassette received by said member;

indentifying indicia means and a light-density scale carried by the protruding tab portion of the electroluminescent panel; and means automatically responsive to the receipt of a cassette by the supporting member for energizing said panel, to illuminate the same and thereby simultaneously expose the film within the cassette with the information on the indicia means and on the light-density scale.

11. Apparatus for placing density information and identifying indicia on X-ray film within a cassette having a panel receiving slot adjacent one edge thereof, the apparatus comprising, in combination:

a cassette supporting member including edge guide means for receiving a cassette;

an electroluminescent panel carried by the supporting member, the panel having a pivotally mounted protruding tab portion in position to extend within the slot of a cassette received by said member;

means including identifying indicia and a light-density scale removably disposed on the protruding tab portion of the electroluminescent panel, the light-density scale being formed of spaced-apart areas of varying density which lie in a single flat plane;

means automatically responsive to the receipt of a cassette by the supporting member of energizing said panel, to illuminate the same and thereby simultaneously expose the film within the cassette to the identifying indicia and the light density scale; and slide means movably mounted on the cassette supporting member adjacent the opposite surfaces of the electroluminescent panel for supporting the same, the slide means being engaged by said one cassette edge and being urged thereby away from supporting relationship with the surfaces of said panel as the cassette is received by said supporting member.

* * * * *